June 14, 1927.  1,632,634

J. A. STUMPENHORST

MOTOR VEHICLE TRANSMISSION MECHANISM

Filed April 25, 1923

WITNESSES:
Fred C. Wilham
R. J. Fitzgerald

INVENTOR
John A. Stumpenhorst
BY
H. M. Biebel
ATTORNEY

Patented June 14, 1927.

1,632,634

UNITED STATES PATENT OFFICE.

JOHN A. STUMPENHORST, OF WILKINSBURG, PENNSYLVANIA, ASSIGNOR TO DUPLEX TRANSMISSION COMPANY, A CORPORATION OF DELAWARE.

MOTOR-VEHICLE TRANSMISSION MECHANISM.

Application filed April 25, 1923. Serial No. 634,458.

My invention relates to motor vehicles and particularly to power transmitting mechanisms for such vehicles.

One object of my invention is to provide a relatively simple and compact mechanism that shall permit of disconnecting the change-speed gear set of a motor vehicle from the driven means, which mechanism shall be actuated by the gear-shifting means.

Another object of my invention is to provide a disconnecting mechanism that is interlocked with the means usually provided for actuating the main clutch, so that the change-speed gear set may be disconnected from the driven means and the gears changed, only at the time that the main clutch is disengaged.

In practicing my invention I provide the usual motor-driven change-speed gear set, having a main clutch operatively connecting the two parts, and further provide an auxiliary multiple-jaw clutch operatively connected to the change-speed gear set and located between it and the driven means. I provide any desired type of gear-shifting means to effect changes in the internal connections of the change-speed gear set and further provide a mechanism to disengage the auxiliary clutch whenever the gears are changed by the gearshifting means. This mechanism comprises an integral extension on each of the usual shifter rods, provided with teeth and constituting a rack bar. Pivotally mounted toothed sectors operatively engage the teeth in the respective shifter rods and are respectively provided with a depending extension to which the upper end of a link is pivotally connected. The lower end of each link is pivotally connected to an over-running hook member that is slidably mounted in a lug that is integral with or secured against the gear set casing.

One of each of the pivotally mounted toothed sectors, and the link and hook member operatively associated therewith is provided on each side of the casing containing the gear set, in order that the operation of either of the shifter rods may operate a hook member. A forked lever is pivotally mounted within the casing, with its free end in operative engagement with one of the members of the multiple-jaw clutch. A short lever is operatively connected to the forked lever, angularly displaced relatively thereto and is engaged by the over running hook member as it moves in a vertically upward direction when actuated by the co-operating shifter rod. This action causes the forked lever to disconnect the two parts of the auxiliary clutch which is thereafter caused to be reconnected by resilient means. When the over running hook member moves in a downwardly direction it is permitted to move past the short lever by integral resilient means.

Interlocking means is provided between the respective toothed sectors and the foot-pedal lever actuating the main clutch, and may comprise a bell crank lever pivotally mounted intermediate its ends, one end of which normally engages an opening in the toothed sector and the other end of which is connected to a bent link member that is operatively connected to the foot-pedal lever.

The device embodying my present invention is particularly applicable to and may be used in conjunction with the device disclosed and claimed in my co-pending application Serial No. 618,760, filed Feb. 13, 1923. The device disclosed and claimed in my co-pending application, Serial No. 617,218, filed Feb. 6, 1923 may also be employed with the device embodying my present invention. The device disclosed and claimed in the present application is, however, not limited in its use to any particular design of change-speed gear set, of gear-shifting means, or of auxiliary clutch, one type of which is disclosed in my Patent No. 1,396,074 issued November 8, 1921, and assigned to the Duplex Transmission Company. The device embodying my present invention may be employed with or embodied in a change-speed gear set that is actuated either manually or by either mechanical or electrical automatic means and is also applicable to the so-called preselective change-speed gear mechanisms. Its only requirement is that the change-speed gear set mechanism be of the type that has a neutral position and a plurality of operative positions.

In the single sheet of drawings,

Figure 1 is a view, partly in vertical longitudinal section and partly in side elevation, of a motor vehicle transmission mechanism comprising the device embodying my invention, Fig. 2 is a view, in side elevation, with certain portions cut away, of a device embodying my invention as mounted in the casing of a gear set, Fig. 3 is a view, in rear elevation, of the parts shown in Fig. 2, Fig. 4 is a top plan view of a gear set casing with certain parts omitted and illustrating more particularly the interlocking means comprising a part of my invention, and Fig. 5 is a top plan view of an over running hook member comprising a part of the device embodying my invention.

Referring more particularly to Fig. 1 of the drawing, the numeral 10 designates an engine of any standard design effective to drive an automotive vehicle, the driven member of which is here represented by a main shaft 11 that is connected by the usual universal joint 12 to a drive shaft 13. A shaft 14 of the engine 10 has suitably secured thereon one half of a main clutch 15, the other portion thereof, designated by the numeral 16, being caused to normally operatively engage the part 15 by a spring 17. A foot pedal lever 18 is provided to manually actuate the part 16 to disengage the same from the part 15. While I have shown a particular construction of main clutch and of clutch actuating means, I do not desire to be limited thereto, as any suitable or desired construction of such parts may be employed.

A casing 19 contains a change-speed gear set aggregate 21 which may be of any suitable type usually employed for such purposes. Means for effecting changes in the internal connections of said gear set may comprise a manually operable gear shift lever 22 that is pivotally mounted in the top of the casing 19, and that selectively engages the shifter rods 23 and 24 of the usual type provided in such devices. Forked levers 25 are mounted on the respective shifter rods 23 and 24 and extend downwardly to operatively engage two gear wheels mounted on a shaft 26 that is axially alined with a shaft 27 upon which the main clutch member 16 is slidably mounted. Upon moving the gear shift lever 22 in a lateral direction, its lower end is caused to engage a notch in either one of the two shifter rods, and then moving the lever 22 and therefore one of the shifter rods longitudinally of the casing 19, one of the gear wheels on the shaft 26 is caused to operatively engage a co-operating gear wheel in the usual well known manner to effect a change in the internal connections of the gear set.

I provide an auxiliary clutch member 28 comprising a rear half 29 that is mounted on and secured to a part of the shaft 13 that extends into the rear portion of the casing 19 and is supported by a suitable bearing member 31, and a co-operating forward half 32 that is mounted on the splined shaft 26 as is more particularly described and claimed in the above mentioned co-pending application, Serial No. 618,760. A helical spring 33 encircles a portion of the member 32, a stop plate 34 mounted on the splined shaft 26 being engaged by one end of the spring 33, the other end of which engages an integral radial flange 35 of the member 32.

The shifter rods 23 and 24 are provided with integral, rearwardly extending portions that are severally provided with a plurality of teeth 36 located in the under face thereof. Toothed sectors 37 are pivotally mounted in suitable bosses or lugs 38 mounted on the upper surface of the rear portion of the casing 19, each sector being mounted on and secured to a short shaft 39, the two shafts being maintained in substantially coaxial alinement by a tubular member 41 located over the adjacent ends of the shafts 39 and suitably secured to one of them. Depending levers 42 are secured on the outer end of each of the shafts 39, and have respectively connected thereto depending links 43 by means of a pin 44.

Over running hook members adapted to move vertically at the side of the rear end of the casing 19 are pivotally connected to the lower ends of the levers 43 and severally comprise a relatively small tubular casing 45, having an integral rear portion 46, substantially rectangular in lateral section, and having an annular flange 47 at its front end. A helical spring 48 is located within the tubular casing 45 and a hook member 49, of substantially T-shape, is resiliently pressed outwardly by the spring 48 against a cover member 51 suitably secured against the flange 47, a portion extending through the cover member, substantially as illustrated. The hook member 49 is provided with a rearwardly extending guide rod 52 sliding in a suitable opening in the portion 46 in order to maintain the hook member 49 in proper alinement during the operation of the device. The portion 46 moves in a guideway of overhung channel section that is provided by a lateral lug or extension 53 that may be suitably machined to provide a vertically extending guideway therefor. The lug 53 may be either integral with or suitably secured against the side of the casing 19. When the shifter rods are moved by the lever 22 the toothed sectors 37 operatively connected thereto are given a turning movement on the shaft 39, thereby raising one of the links 43 and the co-operating hook member 49. This raising of the hook member is obtained irrespective of whether one of the shifter rods is moved from its intermediate neutral position in a forwardly or in a backwardly direction.

The upper end of the portions 46 are respectively provided with an integral extension or lug 54 to which the lower end of the cooperating lever 43 is pivotally connected. The upper surface of the hook member 49 is substantially plane and extends in a substantially horizontal direction, while the lower surface thereof is of arcuate form.

A means for actuating the member 32 of the auxiliary clutch to disengage the two parts thereof is located within the casing 19 and comprises a forked shifting lever 55 that is mounted on and secured to a shaft 56, which shaft is, in turn pivotally mounted in suitable lugs 57 integral with or secured against the outer sides of the casing 19, the upper forked end of the lever 55 being in operative engagement with one face of the radial flange 35. Short hook-members or levers 58 are mounted on each of the two ends of the shaft 56 and have an upper curved surface and a lower substantially straight surface. The short levers 58 on the shaft 57 are so located relatively to the overrunning hook member 49 as to be engaged and actuated thereby whenever the hook member and the parts operatively associated therewith, more particularly the members 45 and 46, move in an upwardly direction under the influence of a turning movement of one of the toothed sectors 37 when a shifter rod is moved from its normal intermediate, that is, its neutral position, to one of its operative positions. When the hook member 49 is thus moved upwardly it causes a turning movement of the short lever 58 and of the forked lever 55, whereby the member 32 is disengaged from its cooperating clutch member 29, and whereby the change-speed gear set is entirely disconnected from the driven shaft 11 and therefore from the rest of the driven parts of the motor vehicle. The spring member 33 is compressed when the member 32 is moved away from the member 29, and as soon as the hook member 49 has moved a sufficient distance upwardly it moves out of the way of the short lever 58, thereby permitting the helical spring 33 to move back the member 32 so as to cause it to again engage the member 29.

When the operator moves either one of the shifter rods 23 or 24 by means of the gear shift lever 22 from one of their respective operative positions back to the neutral position, the hook member 49 and the closely associated parts are moved in a downwardly direction and the lower curved surface of the hook member 49 will operatively engage the upper curved surface of the short lever 58, whereby the hook member 49 is caused to move inwardly against the pressure of the spring 48, being maintained in proper alinement in the tubular member 45 by the extension rod 52. This permits the operator to shift from an operative position to a neutral position of the gear set without causing the mechanism to disengage the auxiliary clutch. Suitable means (not shown) may be provided to prevent a turning movement of the members 55, 56 and 58 when the hook member 49 is being moved downwardly.

Means for interlocking the mechanism for actuating the auxiliary clutch with the main-clutch-actuating means may comprise a bell crank lever 59 pivotally mounted in a substantially horizontal plane in a lug 61 provided on the casing 19. One end of the lever 59 may be provided with a reduced portion 62 that normally operatively engages one of a plurality of openings 63 provided in the outer surface of the toothed sector 37. A bent link member 64 has its rear end pivotally connected to the short end of the bell crank lever 59 and has its forward end suitably secured to a part of the foot pedal lever 18. It may be slidably supported in lugs 65 integral with or secured to the side of the casing. A bell crank lever 59 and link 64 is provided for each side of the casing whereby each of the toothed sectors 37 is provided with means interlocking it with the main-clutch-actuating means. When the operator presses the foot pedal lever 18 in a forwardly direction to disengage the clutch member 16 from the clutch member 15, the two levers 64 are also moved in a forwardly direction, whereby the reduced end 62 of the bell crank lever 59 is moved out of the opening 63 normally occupied by the same. Three openings 63 are provided in each of the sectors 37, one for the neutral position of the gear shifting means and one for each of the two operative positions. As long as the main clutch is engaged the operator is prevented from actuating the gear shifting means by reason of the hereinbefore described interlock, but as soon as the main clutch is disengaged he is free to shift the gears, as the outer ends of the bell crank levers 59 have been disengaged from the sectors 37. When the gears have been shifted and the foot pedal lever allowed to return to its normal position the reduced ends 62 engage one of the outer openings 63, the sectors 37 having been moved by the shifter rods in either a forwardly or a backwardly direction, whereby the two devices are again interlocked. While I have shown and described a particular form of interlocking means, I do not desire to be limited thereto, as it is easily possible to devise other and similar means to obtain the same results.

The operation of the device embodying my invention as applied to a change-speed gear set may be briefly described as follows:—

When the operator desires to effect a change in the internal connections of the gear set, that is, desires to shift gears, he first moves the foot pedal 18 to cause disengagement of the two parts of the main clutch. If the vehicle is in motion and if he should desire to change from high gear to intermediate, or to low gear, he would experience difficulty in the ordinary change-speed gear set by reason of the fact that the two gear wheels to be placed in mesh with each other are operating at relatively very different speeds, and that one of these is operatively connected to the vehicle itself, whereby any sudden change of speed of that gear wheel is practically prevented. When the device embodying my invention is applied to such a change-speed gear set the action of the operator in moving the gear shift lever to shift gears causes a simultaneous actuation of the auxiliary clutch to disengage the change-speed gear set from the driven part or parts of the motor vehicle, whereby the shifting of gears is made relatively easy as described in detail in my Patent No. 1,396,074 issued November 8, 1921. The resilient spring member causes a return movement of the one part of the auxiliary clutch toward the other part, and as the longitudinal axial jaw surfaces are provided with either a single or a double bevel as more particularly disclosed in my co-pending application Serial No. 618,760, re-engagement of the two auxiliary clutch parts is effected quickly under ordinary operating conditions.

When the operator again desires to change gears or to stop, he first causes disengagement of the main clutch by actuating the foot pedal lever 18 and then moves the shifter rod from its present operative position to its neutral position. During the operation the over-running hook member moves downwardly past the short lever 58 without actuating it and the forked lever 55, thus making it possible to change from an operative position of the gear set to a neutral position without causing actuation of the auxiliary clutch.

While I have shown and described a manually operable gear-shifting means, my invention is not limited to such means only, as it can be applied to automatic gear shifting means of any kind, whether actuated mechanically or electrically. My invention is in fact particularly applicable to such automatic gear shifting means where it is easily possible to provide sufficient force not only to shift the gears but also to actuate the mechanism embodying my invention. The use of an auxiliary clutch such as described in the hereinbefore mentioned co-pending applications, is practically necessary in automatic gear shifting devices because of the relatively large amount of power available for shifting the gears, making it necessary to have the conditions attending the shifting of the gears the best possible that can be obtained. The use of the device embodying my invention in connection with an auxiliary clutch permits of obtaining such conditions and therefore easy and proper shifting of gears is assured.

Various modifications may be made in the device embodying my invention without departing from the spirit and scope thereof, and I desire that only such limitations shall be placed thereon as are imposed by the prior art or are set forth in the appended claims.

I claim as my invention:—

1. In a motor vehicle transmission mechanism, the combination with a motor driven change-speed gear set comprising a plurality of shifter rods, and an auxiliary clutch operatively connecting said gear set to a driven means, of a single means, actuated by either of said shifter rods when moving from a neutral to an operative position only, for actuating said auxiliary clutch.

2. In a motor vehicle transmission mechanism, the combination with a motor driven change-speed gear set comprising a plurality of shifter rods, and an auxiliary clutch operatively connecting said gear set to a driven means, of a single means, actuated by either of said shifter rods when moving from a neutral to an operative position only, for actuating said auxiliary clutch, said means comprising an over-running hook member.

3. In a motor vehicle transmission mechanism, the combination with a motor driven change-speed gear set comprising a plurality of shifter rods, and an auxiliary clutch operatively connecting said gear set to a driven means, of means actuated by one of said shifter rods for effecting disengagement of said auxiliary clutch, said means comprising a plurality of teeth on said shifter rod, a pivotally mounted toothed sector operatively engaging said teeth, an over-running hook member operatively connected to said toothed sector, and a lever operatively engaging said auxiliary clutch and actuated by said hook member.

4. In a motor vehicle transmission mechanism, the combination with a motor driven change-speed gear set comprising a plurality of shifter rods, and an auxiliary clutch operatively connecting said gear set to a driven means, of means actuated by one of said shifter rods for effecting disengagement of said auxiliary clutch, said means comprising a plurality of teeth on each of said shifter rods, pivotally mounted toothed sectors operatively engaging said toothed shifter rods, a lever operatively engaging said auxiliary clutch, and a plurality of over-running hooked members respectively actuated by said toothed sectors and effective upon movement in one direction only to cause said lever to effect disengagement of said auxiliary clutch.

5. In a motor vehicle transmission mechanism, the combination with a motor driven change-speed gear set comprising a plurality of shifter rods, and an auxiliary clutch operatively connecting said gear set to a driven means, of a single means actuated by either of said shifter rods when moving from a neutral to an operative position only, for actuating said auxiliary clutch to its open position, and resilient means for effecting reclosing thereof.

6. In a motor vehicle transmission mechanism, the combination with a motor driven change-speed gear set comprising a plurality of shifter rods, and an auxiliary clutch operatively connecting said gear set to a driven means, of means actuated by one of said shifter rods for effecting disengagement of said auxiliary clutch, said means comprising a plurality of teeth on said shifter rod, a pivotally mounted toothed sector operatively engaging said teeth, an over-running hook member operatively connected to said toothed sector, and a lever operatively engaging said auxiliary clutch and actuated by said hook member, and resilient means operatively engaging said auxiliary clutch for effecting re-engagement thereof.

In testimony whereof, I have hereunto subscribed my name this 24th day of April, 1923.

JOHN A. STUMPENHORST.